Dec. 15, 1925.  1,565,602
P. THOMPSON
METHOD OF TREATING VEGETABLE FIBERS
Filed March 10, 1924    3 Sheets-Sheet 3
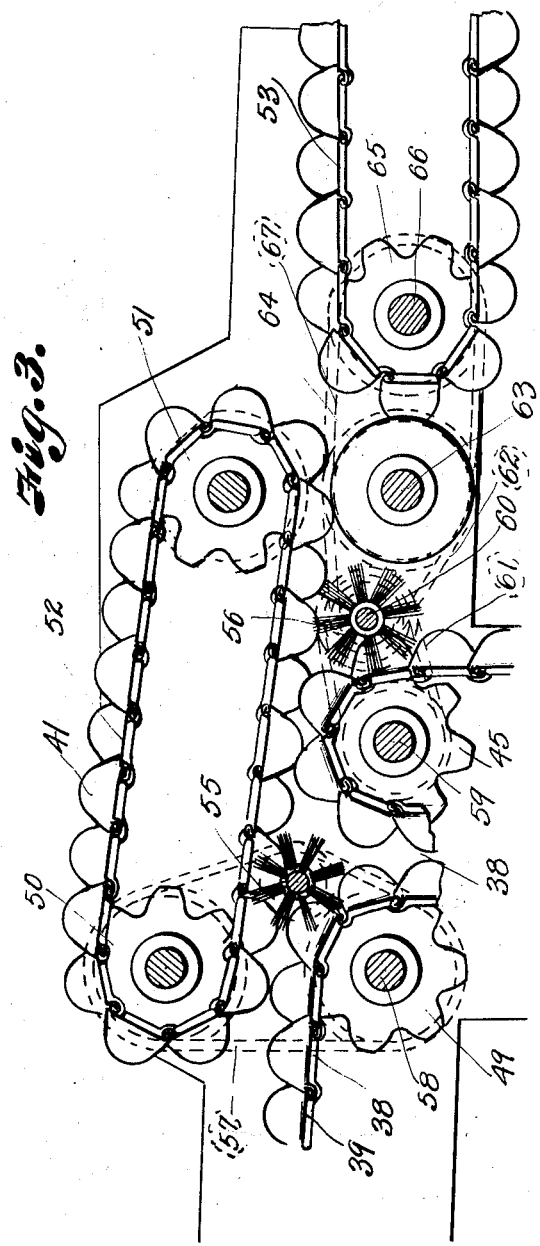
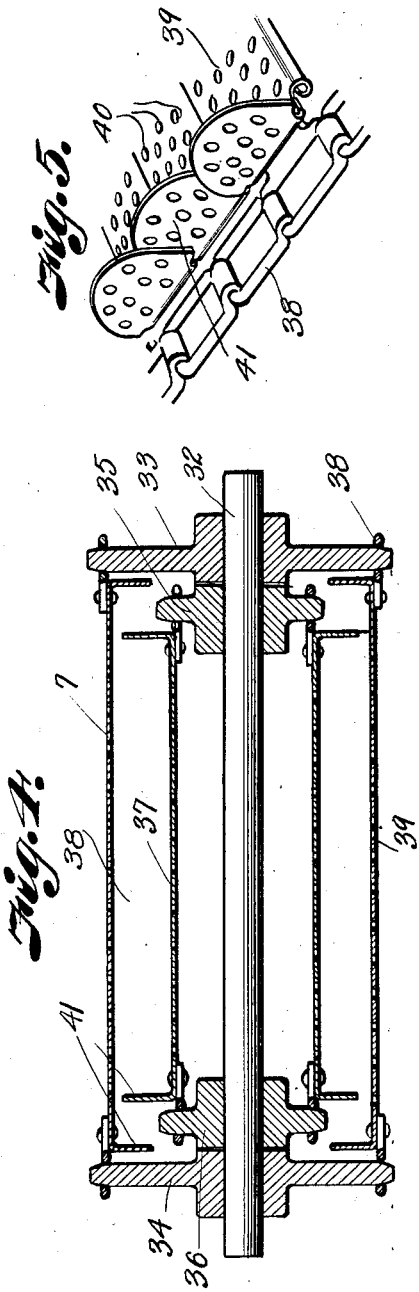
INVENTOR
Percy Thompson
BY
ATTORNEY Patented Dec. 15, 1925.

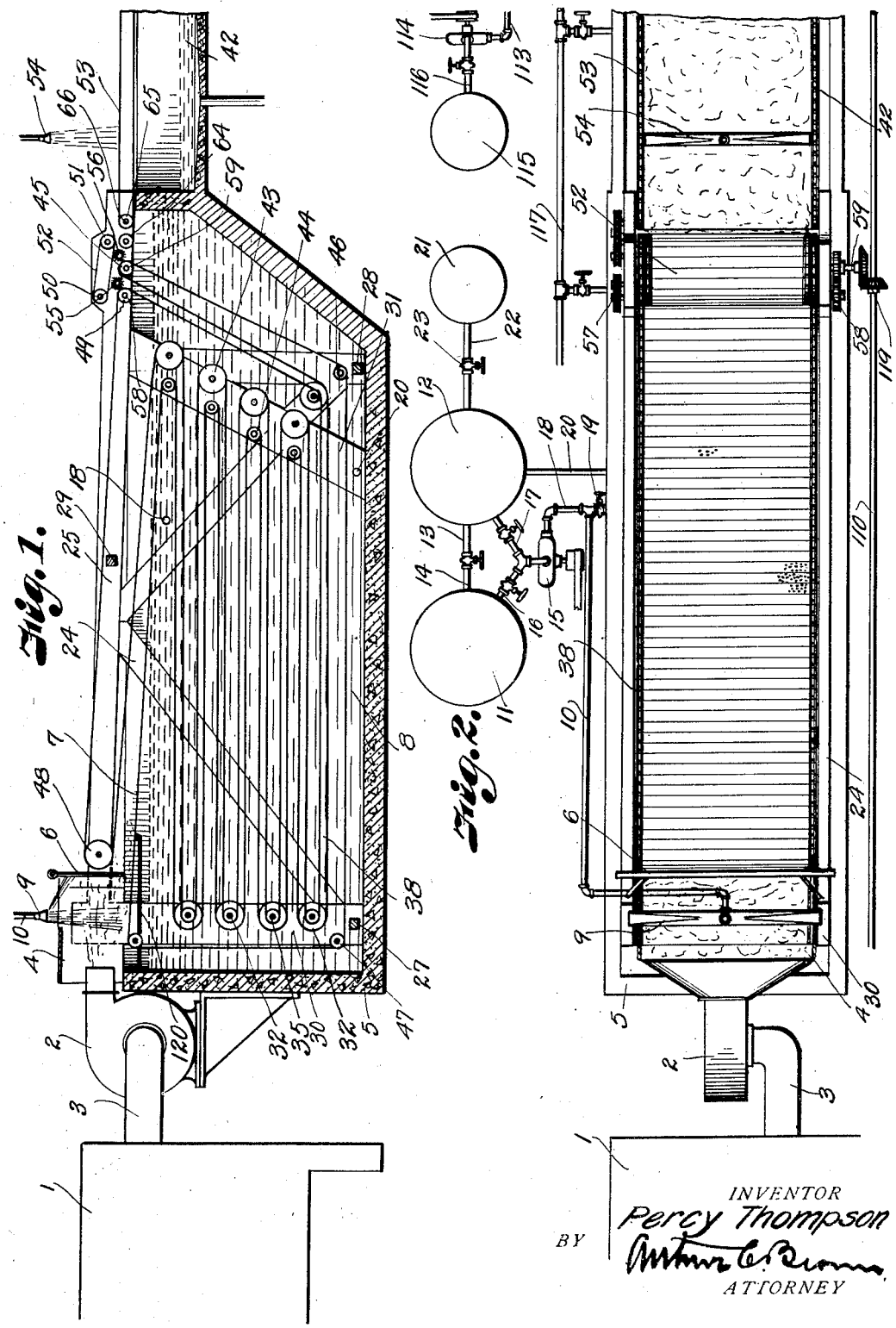

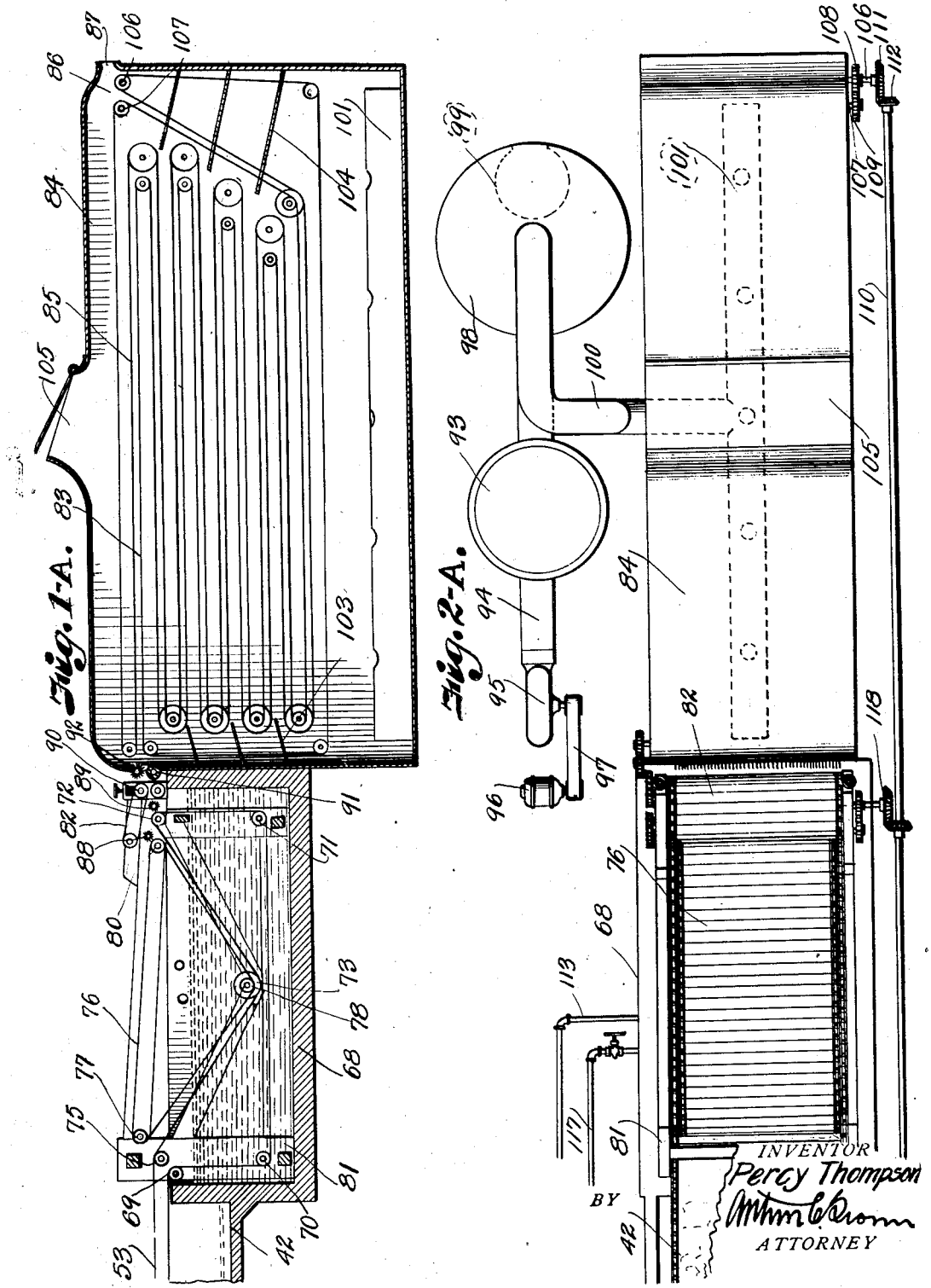

1,565,602

UNITED STATES PATENT OFFICE.

PERCY THOMPSON, OF KANSAS CITY, MISSOURI, ASSIGNOR OF ONE-HALF TO SETH H. LEACH, OF KANSAS CITY, MISSOURI.

METHOD OF TREATING VEGETABLE FIBERS.

Application filed March 10, 1924. Serial No. 698,180.

*To all whom it may concern:*

Be it known that I, PERCY THOMPSON, a citizen of the United States, residing at Kansas City, in the county of Jackson and State of Missouri, have invented certain new and useful Improvements in Methods of Treating Vegetable Fibers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a method of cleaning, bleaching, sterilizing and drying raw cotton, linen and other vegetable fibers. When cotton is picked and handled from field picking to the marketable stage, it contains considerable dirt, sand and other impurities, damaging and discoloring the fiber, thereby materially injuring it and reducing its value. The dirt and other foreign matter is removed by a mechanical cleaner, but the cotton is still unbleached. The bleaching process as heretofore practiced is a relatively long, laborious procedure, which naturally adds to the cost and price of the marketable product.

I have found that a highly satisfactory bleached product can be provided in a considerably less time by a method and heating apparatus contemplated by my invention than is possible with known methods and since time and labor add to the cost of any product, it is obvious that fibrous material, for example cotton, treated by my invention can be marketed at a greater profit and at a lower cost than cotton treated by methods in which the time element extends over relatively long periods.

In carrying out the invention the fiber is delivered from an appropriate machine which may be of any suitable type for finely dividing it, to a liquid saturator and cleaner which will immediately saturate the fiber with a bleach, then the fiber is passed through a bleaching vat or tank in which a suitable bleach such as hypochlorous acid (HOCl) is fed or introduced. The fiber is then passed to a rinse tank or vat, thence to a bluing vat or tank and thence to a drying chamber where it is subjected to the action of hot dry air. The air is passed through the chamber in large volumes at an appreciable velocity and it should be of sufficient temperature to carry off the moisture and it should be here stated that one of the important features of my invention is the provision of means for subjecting the cotton to the action of dry air at an appreciable velocity to absorb the moisture from the cotton and leave it dry and fluffy. The greater the velocity and the greater the volume passed through the drying chamber, the more rapid the drying of the cotton, so I have provided an air impeller for handling relatively large volumes of air and a furnace for raising the temperature of the air and taking out the moisture before it enters the drying chamber.

There are certain novel secondary but highly important features of the invention to be hereinafter referred to and these will all be specifically described in the following description and their construction as well as advantages will be apparent by reference to the accompanying drawings, in which—

Figs. 1 and 1$^A$ (Sheets 1 and 2) are two parts of a longitudinal, sectional view through the apparatus.

Figs. 2 and 2$^A$ are parts of a top plan view of the apparatus.

Fig. 3 is an enlarged detailed view through the conveyor driving mechanism showing part of the conveyor mechanism in the bleach tank, the transfer mechanism for transferring the cotton from the bleach tank to the rinse tank and part of the conveyor for carrying the cotton into the rinse tank.

Fig. 4 is a transverse sectional view through one set of sprockets, such as used for the endless belt in either the bleach tank, the bluing tank or the drying chamber, and Fig. 5 is a detailed perspective view of several of the slats of the conveyor.

Referring now to the drawings by numerals of reference 1 designates a picker of appropriate construction, to divide the fibers. The picker per se constitutes no part of my invention, nor does the blower 2 connected to it through the pipe 3. The fiber is passed from the picker through the fan or air impeller 2 into a hood 4 which extends across the bleach tank or vat 5, thus confining the fiber within specified limits. At the back of the hood is a hinged wall 6 against which the fiber may be blown, in a divided state. The hinged wall 6 constitutes a baffle in connection with the liquid shower for directing the fiber down upon the conveyor 7 which carries the fiber through the bleaching bath 8. I term the hood a saturating hood because at the top of the hood is a spray nozzle 9 having a plurality of rows of perforations, the rows running transversely of the fiber conveyor so that the liquid will be directed downwardly in the form of sheets of rain or walls of liquid through which the fiber will be blown so that it will become thoroughly and immediately impregnated or saturated with the bleach liquid preparatory to passing through the bleaching bath to complete the bleaching effect. The hood 4 provides an inclosing zone to prevent deterioration of the bleach water by light and air.

The bleaching bath 8 may consist of any suitable bleach for example hypochlorous acid, the bleach being supplied to the nozzle under pressure through a pipe 10. The source of supply for the bleach is in the tanks 11 and 12 connected by a pipe 13 with a valve 14 therein so that communication may be established or cut off between the tank and each tank may individually discharge into a pump 15 through the valve pipes 16 and 17, the pump being connected to the pipe 10 by a pipe 18 as will be clearly seen in Fig. 2. The pipe 18 also discharges into the tank 5, and it may be controlled by a valve 19, see Fig. 2. The pipe 20 leads back from the vat 5 into the tank 12 so that when the valve 14 is cracked, there can be a circulation set up between the tank 12, tank 11, pump 15, pipe 18, pipe 10, pipe 19, vat 5, pipe 20, and back to tank 12. In connection with the moving conveyor, the circulation under pressure produces high agitation in the bleach tank.

There is another tank 21 which contains concentrated bleach and it is connected to the pipe 12 through the pipe 22 and it has a valve 23 therein so that strong concentrated bleach can be fed into the tank 12 from time to time to re-energize or rejuvenate the bleach solution. This arrangement permits the mechanism to be operated practically continuously without shut-downs for bleach treatment, etc. The endless belt 7 as well as the hood is supported upon a removable frame 24 which includes the sides 25 and 26 and cross pieces 27, 28 and 29. There may be as many cross pieces as are convenient or desirable to make the frame rigid enough so that it can be lifted from the vat, for inspection and repairs. The sides including the vertical posts 30 and 31 carry horizontal shafts 32, one being shown in detail in Fig. 4.

On the respective ends of the shafts 32 are sprockets in sets of two, the large sprockets 33 and 34 carrying the endless conveyor section 7 while the smaller sprockets 35 and 36 engage the smaller or narrower conveyor section 37. The conveyor is made up of two endless sections, each really a complete belt in itself. The conveyor sections are each made up of links 38, along each edge of each belt section, the links 38 (see Fig. 5) are connected by cross bars or slots 39 which are perforated as indicated at 40, to allow the bleach water to flow through the conveyor belts and thereby have access to the fiber. At the ends of each slot 39 are perforate wings or baffles 41 extending at right angles thereto so as to constitute guards to prevent the fiber from working off the sides of the belts, that is off the ends of the slats and since the belt sections 7 and 37 are arranged in zigzag flights, one within the other to convey the fiber back and forth longitudinally of the bleaching tank or vat, it will be apparent that the baffles 41 on the slats of the conveyor section 7 extending downwardly and baffles on the slats of the belt section 37 extending upwardly (see Fig. 4), a perforated flexible tubular conveyor is formed, confining the fiber within the space 38, loosely it is true, but in such a manner that it cannot work out of the conveyor, consequently the fiber will be carried back and forth through the bleach a sufficient number of times and at a sufficient speed to insure proper bleaching before the fiber is transferred into the rinsing tank or vat 42, by the transfer device and the wringer which squeezes out the major portion of the bleach before the transfer takes place.

It has been described heretofore how the conveyors maintain their parallelism and weave back and forth through the bleach tank, since they engage the sprockets 33, 34, 35 and 36 loose on the shafts 32. The opposite ends of the flights of the conveyor, however, pass around similar sprockets 43 and 44. These sprockets are not on the same shafts but on separate shafts as will be clearly seen by reference to Fig. 1. The link element of the conveyor 7 in addition to passing around the sprockets 33 and 34 and the sprockets 44, also passes around sprockets 45, 46 and 47 and the belt 37 in addition to passing around the sprockets 35 and 36 and the sprocket 43, also passes around the sprockets 48 and 49 (see Fig. 1).

Above the sprockets 45 and 49 are sprockets 50 and 51 mounted in suitable journals and they carry an endless belt 52 conforming generally to the belt structure heretofore described. The sprockets 50 and 51 rotate in a contra-clockwise direction so that they will drive the conveyor in a direction to move the fiber onto the conveyor 53 to carry it across the rinse tank 42 so that it can be subjected to rinse water issuing from the nozzle 54 connected to a suitable water supply, for example the city service pipes.

In order to assist in removing the fiber from the belt sections 7 and 37, I provide rotary brushes 55 and 56. The brush 55 and the pulley 50 are driven by a belt 57 from a shaft 58 on which the sprocket 49 is located. The sprocket 45 is mounted on a shaft 59. The shaft 59 drives the brush shaft 60 to a belt 61 and motion is taken off the shaft 60 by a belt 62 to drive the shaft 63 of a wringer 64 beneath the transfer belt 52 so that as the cotton or other fiber passes onto the belt 53 the moisture will be squeezed out of it to leave most of the bleach which it has absorbed in the tank 5. The conveyor 53 is driven by a sprocket 65 on a shaft 66 which receives its motion through a belt 67 from the shaft 63 and the conveyor belt 53 passes on into the bluing tank 68. The lower course of the belt 53 passes over the sprockets 69, under the sprockets 70 and 71, over the sprockets 72, under the large sprockets 73, over the sprockets 75 back to sprocket 65. There is another belt 76 which passes around the sprockets 77, and 78, around sprockets 80, back to 77, the belts 53 and 76 conforming to the form of belt heretofore described so that the fiber will be carried through a flexible tunnel-shaped conveyor in passing through the bluing tank and it is here noted that the sprockets are mounted on shafts in a removable frame 81 of appropriate construction so that the frame, sprockets and belts may be all lifted out of the tank 68 if desired.

At the end of the bluing tank is a transfer endless conveyor 82 for transferring the fiber from the bluing tank onto the belt 83 in the drying chamber 84. The fiber is passed onto the conveyor 83 between the belt 82 and the lower course of the conveyor 85, the conveyors 83 and 85 being arranged in substantially the same manner as the belts 7 and 37 in tank 1 and the belts are of substantially the same construction. The discharge ends of the conveyors are at 86 so that the fiber can pass out through an orifice 87 in the end of the chamber 84. The fiber is transferred from the belts 53 and 76 by the rotary brushes 88 and 89 and it then passes through the rollers of the wringer 90 and onto the idler 91 and the penetrating roller 92. The penetrating roller consists of a shaft with a plurality of tines or penetrating needles which will pierce the fiber so that the air may pass through it when it enters the drier to quickly vaporize the moisture so it can be carried off.

It is to be observed of course that while the fiber is blown out of the air impeller in a dry, relatively finely divided state that when it becomes wet, it tends to mat and it remains matted while it passes through the bleaching tank, through the rinse, through the bluing tank and into the drier preparatory to having its moisture removed.

In order to subject the fiber to the action of relatively large volumes of dry air, I have provided a dry air plant with a force draft and the plant includes means for permitting the air to pass through a moisture removing substance, for example calcium chloride, so that before the air has its temperature raised, it is relatively dry. Such a plant is shown in Fig. 2$^A$ as consisting of a receptacle 93 having an inlet 94 to which is attached an air impeller or pump 95 driven by a suitable motor 96 through the medium of a belt 97. The tank or receptacle 93 contains a material having an absorbing characteristic of high efficiency for water or moisture so that the moisture in the air will be absorbed. The air is then led into a heating drum 98 of a furnace 99 and from the heating drum it is led into the drier 84 through the pipe 100. The pipe 100 has on its inner end an elongated trough-shaped discharge nozzle 101 which extends substantially the entire length of the drier chamber 84.

In order to prevent the air from stratifying vertically at the ends of the chamber, I provide upwardly and inwardly inclined baffles 103 and 104 so that the air will be directed through the flexible tubular conveyor containing the fiber and after it passes in, about and through the fiber at a relatively high velocity and in relatively large volumes, due to the capacity of the impeller 93, the moisture will be taken out of the fiber and it will be delivered from the discharge end 87 in a perfectly white, dry condition. The humidified air, that is the air that has taken up the moisture instead of passing back into the apparatus will be blown out of the discharge opening 105 in the top of the drier 84. The conveyors 83 and 85 are driven from the shaft 106, geared to the shaft 107 by the gears 108 and 109, the shaft 106 receiving its motion from a line shaft 110 through the gears 111 and 112. The line shaft 110 also drives the transverse shafts for the remaining belts and it in turn may be driven by any appropriate mechanism.

The bluing material may be furnished to the tank 68 through a pipe 113 which is connected to a pump 114 having its inlet end connected to a bluing tank 115 through a pipe 116 and water may be introduced into the bluing tank 68 through a pipe 117 connected to the city main or to the water service pipes. The pipes 117 also furnishes water under pressure to the rinse nozzle 54 in an appropriate manner. The shaft 72 is driven from the line shaft 110 through the gearing 118 and motion is communicated to the shaft for sprockets 72 and such additional sprocket shafts as have to be driven by transmission will be driven from the line shaft 110 by gearing 119 and suitable transmission is provided for driving the belting members, brushes, etc., so that the sprockets 49, 50 and 51 and brush 55 rotate in a counter-clockwise direction while the sprockets 45, 65 and the brush 56 rotate in a clockwise direction. It is believed that it is unnecessary to go into detail of the elements of the transmission as any mechanic can provide the necessary transmission to make the elements rotate in the proper direction.

I find that when the fiber is blown into the hood and is subjected to the downwardly directed bleach liquid from the nozzle 9 that any dirt, dust and other extraneous matter which it may contain will be washed out by the bleach liquid directed against it. If this objectionable matter was permitted to enter the bleaching vat or tank, it might require shut-downs in order to remove the sludge or solids which might form in the bottom of the bleach tank, therefore while I wish to take advantage of the efficiency of the spraying liquid to wash out any foreign matter from the fiber, I prevent the deposition of the foreign matter in the bleach tank, therefore I provide a screen pan 120 immediately beneath the nozzle 9. This pan should preferably be constructed of reticulated material preferably in the form of a screen with a mesh of sufficient fineness to catch the foreign matter, but permit the liquid to pass into the vat. With such a pan the foreign matter will be screened out of the liquid and since the pan is removably attached to the front of the bleach vat, it may be removed from time to time and cleaned. This is more or less important since it is one of the features of my invention; that it is a continuously operating mechanism, requiring no shut-downs except for inspection and repairs which will occur only at the expiration of relatively long periods and it is to be here noted that the bleach water or liquid is maintained in a constant state of circulation, due to the fact that the pump is forcing the liquid into the vat through pipe 18 and throwing it out through pipe 20, tanks 12 and 11, in the order named and that whenever the bleach shows a strength below that required or whenever the strength of the bleach liquid approximates that which is considered the minimum for proper operation, additional concentrated bleach may be fed off from the tank 21 into the tank 12.

Of course while the device or apparatus constructing the subject matter of my invention is to all intents and purposes automatic in its operation, it is not contended that it will operate successfully without an attendant to observe general conditions, so tests will be made from time to time for the strength of the bleach, the bluing water and the like, but the apparatus will operate successfully over long periods with practically no attention.

It is also to be noted that when the fiber is blown into the apparatus, it will be confined in its passage through the apparatus between sets of conveyor elements provided with side walls which combined, will form flexible conduits eliminating any possibility of the fiber moving off the belts into the vats or tanks and that while the fiber is immediately saturated when it enters the apparatus and while it remains so during its passage through the various treatment tanks until it reaches the drying chamber, it will have its moisture quickly dissipated, due to the fact that the air is first dehydrated, that is, it has had its moisture taken out before it passes through the furnace or device to have its temperature raised. As a result only dry hot air can be introduced into the drying chamber. If the air was not first dehydrated before it entered the drying chamber, it would contain more or less moisture and as a result, its affinity for moisture, that is, its ability to take up moisture from the cotton would be reduced in proportion to the amount of humidity which it contained, so I consider it an important feature of my invention that dry air is passed through the drying chamber in large quantities and at an appreciable temperature and velocity.

What I claim and desire to secure by Letters-Patent is:

1. The herein described method of bleaching fiber and like material which consists in passing dry material to be treated in a divided state through a zone while precipitating bleach water across the path of the material to saturate it, passing the material through a bleaching bath, rinsing it, passing it through a bluing bath, and subjecting it to the action of a relatively large volume of hot dry air at high velocity to take off the vapor generated from the moisture in the material by the hot dry air.

2. The herein described method of bleaching vegetable fiber, which consists in subjecting the fiber in a divided state to the action of a wet bleach and then drying the fiber by subjecting it to the action of a large volume of hot dry air at an appreciable velocity.

3. The herein described method of treating vegetable fiber, which consists in passing it through a zone while precipitating bleach water across the path of the fiber, allowing the bleach to act upon the fiber, removing the excess bleach solution from the fiber and forcing dry air over and through the fiber at an appreciable velocity.

4. The herein described method of treating vegetable fiber which consists in passing it in a divided state through a zone while precipitating bleach water across the path of the fiber, allowing the bleach to act upon the fiber, removing the excess bleach solution from the fiber and flowing dry air over and through the fiber at an appreciable velocity.

5. The herein described method of treating vegetable fiber which consists in blowing it in a divided state through a zone in which bleach water is precipitated across the path of the fiber, allowing the bleach water to act upon the fiber removing at least some of the bleach water from the fiber, and forcing hot dry air over and through the fiber at an appreciable velocity.

6. The herein described method of treating material susceptible of being bleached, which consists in passing the material through an inclosed zone, spraying bleach water upon the material within the zone so as to prevent deterioration of the bleach water by light and air, and subjecting the material to the action of relatively large quantities of hot dry air at appreciable velocity.

In testimony whereof I affix my signature.

PERCY THOMPSON.